(12) United States Patent
Yocum et al.

(10) Patent No.: US 11,810,022 B2
(45) Date of Patent: Nov. 7, 2023

(54) CONTACT CENTER CALL VOLUME PREDICTION

(71) Applicant: Intuit Inc., Mountain View, CA (US)

(72) Inventors: Kenneth Grant Yocum, Encinitas, CA (US); Christopher Aprea, San Diego, CA (US); Joseph Michael Mandozzi, San Diego, CA (US); Christopher Rivera, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 737 days.

(21) Appl. No.: 16/805,664

(22) Filed: Feb. 28, 2020

(65) Prior Publication Data

US 2021/0271925 A1    Sep. 2, 2021

(51) Int. Cl.
*G06Q 10/00* (2023.01)
*H04M 3/523* (2006.01)
*G06N 20/00* (2019.01)
*G06F 18/20* (2023.01)
*G06F 18/21* (2023.01)
*G06F 18/25* (2023.01)

(52) U.S. Cl.
CPC ........... *G06Q 10/00* (2013.01); *G06F 18/217* (2023.01); *G06F 18/251* (2023.01); *G06F 18/285* (2023.01); *G06N 20/00* (2019.01); *H04M 3/5238* (2013.01)

(58) Field of Classification Search
CPC .............................. G06N 20/00; G06Q 10/04
See application file for complete search history.

(56) References Cited

U.S. PATENT DOCUMENTS

| | | | |
|---|---|---|---|
| 2014/0219436 A1* | 8/2014 | Kosiba | G06Q 10/06311 379/265.02 |
| 2017/0220939 A1* | 8/2017 | Bansal | G06N 5/04 |
| 2020/0257992 A1* | 8/2020 | Achin | G06N 20/10 |

* cited by examiner

*Primary Examiner* — Ross Varndell
(74) *Attorney, Agent, or Firm* — Ferguson Braswell Fraser Kubasta PC

(57) ABSTRACT

A method for using piecewise forecasts involves obtaining, by a model discovery service, a plurality of models and generating, by a demand prediction service, a plurality of values for a time series variable. The plurality of values corresponding to a plurality of days to be predicted. The method further involves inputting the plurality of values for the time series variable as part of a piecewise forecast to a headcount estimation service and generating, by the headcount estimation service with the piecewise forecast, an estimated headcount from the time series variable.

20 Claims, 5 Drawing Sheets

CONTACT CENTER CALL VOLUME PREDICTION

BACKGROUND

Contact centers may receive calls from customers requesting assistance. Call centers need to have an appropriate headcount of staff available to handle the amount of calls received. Thus, the correct headcount directly depends upon an accurate estimation of call volume (i.e., number of customer contacts). The call volume can be estimated using models that predict future call volume out to a specific time horizon (e.g., 365 days into the future). A challenge is to obtain models with which to estimate call volume that can predict forward in time accurately.

SUMMARY

In general, in one aspect, one or more embodiments relate to a method for using piecewise forecasts. The method includes obtaining, by a model discovery service, a plurality of models. Obtaining the models includes, for each model horizon of a plurality of model horizons, training a plurality of training models having the model horizon; generating a plurality of cross validation metrics from the plurality of training models; and selecting a training model of the plurality of training models as a selected model for the model horizon using the plurality of cross validation metrics. The method further includes generating, by a demand prediction service, a plurality of values for a time series variable, the plurality of values corresponding to a plurality of days to be predicted. Generating the plurality of values involves selecting, for a day of the plurality of days, the selected model having the model horizon with a lowest value that is greater than or equal to an ordinal value of the day. The method further includes inputting the plurality of values for the time series variable as part of a piecewise forecast to a headcount estimation service; and generating, by the headcount estimation service with the piecewise forecast, an estimated headcount from the time series variable.

In general, in one aspect, one or more embodiments relate to a system that includes a processor and a memory coupled to the processor. The memory includes an application, wherein the application executes on the processor, uses the memory, and is configured for obtaining, by a model discovery service, a plurality of models. Obtaining the models includes, for each model horizon of a plurality of model horizons, training a plurality of training models having the model horizon; generating a plurality of cross validation metrics from the plurality of training models; and selecting a training model of the plurality of training models as a selected model for the model horizon using the plurality of cross validation metrics. The application is further configured for generating, by a demand prediction service, a plurality of values for a time series variable, the plurality of values corresponding to a plurality of days to be predicted. Generating the plurality of values includes selecting, for a day of the plurality of days, the selected model having the model horizon with a lowest value that is greater than or equal to an ordinal value of the day. The application is further configured for inputting the plurality of values for the time series variable as part of a piecewise forecast to a headcount estimation service; and generating, by the headcount estimation service with the piecewise forecast, an estimated headcount from the time series variable.

In general, in one aspect, one or more embodiments relate to a non-transitory computer readable medium. The non-transitory computer readable medium includes computer readable program code for obtaining, by a model discovery service, a plurality of models. Obtaining the models includes, for each model horizon of a plurality of model horizons, training a plurality of training models having the model horizon; generating a plurality of cross validation metrics from the plurality of training models; and selecting a training model of the plurality of training models as a selected model for the model horizon using the plurality of cross validation metrics. The non-transitory computer readable medium includes computer readable program code for generating, by a demand prediction service, a plurality of values for a time series variable, the plurality of values corresponding to a plurality of days to be predicted. Generating the plurality of values includes selecting, for a day of the plurality of days, the selected model having the model horizon with a lowest value that is greater than or equal to an ordinal value of the day. The non-transitory computer readable medium includes computer readable program code for inputting the plurality of values for the time series variable as part of a piecewise forecast to a headcount estimation service; and generating, by the headcount estimation service with the piecewise forecast, an estimated headcount from the time series variable.

Other aspects of the invention will be apparent from the following description and the appended claims.

DETAILED DESCRIPTION

Figure 1:
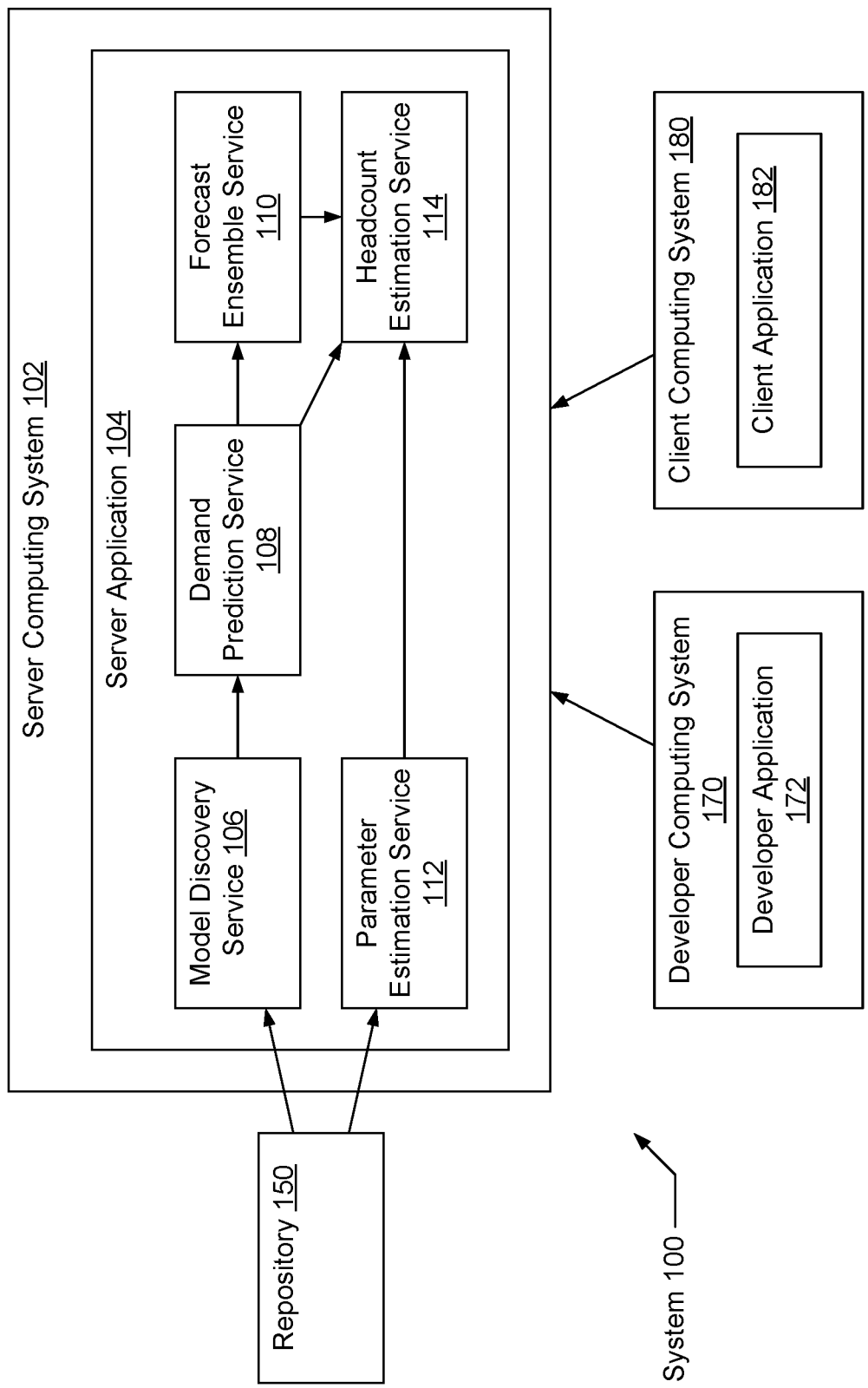
FIG. 1 shows a diagram of systems in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, models are trained to predict time series data, which may include the average handle time and call volume. Additional parameters may also be provided, including a service-level objective. From these inputs and parameters, a headcount may be generated.

The average handle time may identify the amount of time spent by a representative handling a call from a customer. The average handle time may be a floating point value that represents the number of seconds or minutes a representative spends on a phone call.

The call volume identifies the number of phone calls that are expected to be received during a specified time interval. The call volume may be a floating-point number representing the number of calls expected over daily, hourly, half hourly, etc., increments.

The service-level objective (SLO) identifies the percentile of calls that are to be answered within a given amount of time, e.g., 50% of the calls to be answered within 5 minutes. The call center operators set this SLO as a business-level constraint for running the business. Note, there may be additional parameters set by the business that modify the total number of hours each agent has to answer these calls.

The headcount identifies how many representatives are needed to be able to handle the expected amount of calls, while still meeting the SLO. The headcount may be a floating point or rounded integer value identifying the number of representatives needed over a period of time (e.g., daily, hourly, half hourly, etc.).

The predictive models, which may be but are not limited to being autoregressive, are differentiated by the time series to be predicted (e.g., in the case of call centers each separate segmentation of calls is referred to as a "forecast group"), prediction horizon, and class for which the models are selected. A forecast group is a group of contacts for which a forecast is made. As an example, a company may have multiple call centers that service different business units of the company. The different call centers and the different business units may be different forecast groups.

A model horizon identifies, for a model, the maximum number of days in the future for which the model may be used to make a prediction. For example, a model with a model horizon of 1 may be used to predict a value for a variable up to one day in the future and a model with a model horizon of 5 may be used to predict values for a variable up to 5 days in the future, including for days 2, 3, and 4.

A model class identifies, for a model, the class of the model. Different classes may be trained and scored differently during training to identify the best performing model. The classes may relate to, but are not be limited to, seasonality, which is how the model performs with respect to a particular period of time, e.g., Summer, Fall, tax season, etc. Thus, example classes may include "all-season", "in-season", and "out-of-season." The "all-season" class of models may be trained and/or scored using data regardless of season. The "in-season" class of models may be trained and/or scored using data that is "in season", e.g., during the months of February through April. The "out-of-season" class of models may be trained and/or scored using data that is "out of season", e.g., during the months outside of February through April, which is the months of May through January. Additionally, there may be a "tax peak" model, which may be trained and/or scored for the peak tax season and include the months of March and April.

An autoregressive (AR) model is a representation of a type of random process to describe time-varying processes. Autoregressive models may specify that the output or dependent variable depends linearly on their own previous values and on a stochastic term (an imperfectly predictable term). Autoregressive models may be applied to both stationary and non-stationary time series. Autoregressive models may include moving-average (MA) components to form autoregressive moving average (ARMA) and they may also include differencing components in which case they can be termed autoregressive integrated moving average (ARIMA) models of time series. Autoregressive models may also include vector autoregressive models (VARs), which may include more than one evolving random variable.

Non-linear models, such as neural networks, may also be used as autoregressive models. For example, convolutional neural networks (CNNs), recurrent neural networks (RNNs), long short term memories (LSTMs), etc., may be used to model time series variables. Neural network autoregressive models may use inputs that include the previous values of the time series for which predictions are being made with the neural network autoregressive model.

For a given schedule of individual days (i.e., points in time) for which predictions are to be made, the system may select the best model by forecast group, prediction horizon, and model class for a particular day. The selection of the best model may be made independent of prior choices of models or they may be selected to optimize an objective function across the set of models used to make the forecast. Predictions are then made with a set of models to generate a piecewise forecast using the best model for a particular day.

Turning to FIG. 1, the system (100) includes the server computing system (102) that predicts contact center call volume. The server computing system (102) includes the server application (104). The server application (104) includes the model discovery service (106), the demand prediction service (108), the forecast ensemble service (110), the parameter estimation service (112), and the headcount estimation service (114).

The model discovery service (106) is a set of programs executing on the server computing system (102) as part of the server application (104). The model discovery service (106) identifies and trains the models used to generate predictions of time series variable values that may be used as inputs to generate headcount predictions. The model discovery service (106) may receive input data from the repository (150), train the models, score the models, select the best scoring models according to the future time range to forecast, and provide this selection of models to the demand prediction service (108).

The demand prediction service (108) is a set of programs executing on the server computing system (102) as part of the server application (104). The demand prediction service (108) generates predictions of time series variable values using piecewise model prediction. The demand prediction service (108) may receive the selection of best models and their specifications from the model discovery service (106), train the models, generate predictions for the time series variable values, and provide the variable values to the forecast ensemble service (110).

The forecast ensemble service (110) is a set of programs executing on the server computing system (102) as part of the server application (104). The forecast ensemble service (110) assembles forecasts of values of the variables. The forecast ensemble service (110) may receive the predicted variable values (which may be referred to as a machine learning forecast) from the demand prediction service (108) and receive forecasted variable values from an analyst forecast. The analyst forecast may be an alternative forecast. The analyst forecast may be generated by an analyst using a spreadsheet program on a computing system. The machine learning forecast and the analyst forecast may be combined using an ensemble algorithm, of which a weighted average is one possible method, to generate a combined forecast. After assembling a combined forecast, the forecast ensemble service (110) may provide the combined forecast to the headcount estimation service (114).

The parameter estimation service (112) is a set of programs executing on the server computing system (102) as part of the server application (104). The parameter estimation service (112) estimates parameters used by the headcount estimation service to generate the headcount estimation. As an example, the parameters may include, but are not be limited to, average call handle time, and customer call arrival patterns.

The headcount estimation service (114) is a set of programs executing on the server computing system (102) as part of the server application (104). The headcount estimation service (114) may receive the parameters from the parameter estimation service (112), the forecast from the demand prediction service (108), the combined forecast from the forecast ensemble service (110) and generate a headcount estimation based on the parameters and forecasts.

Figure 5A:
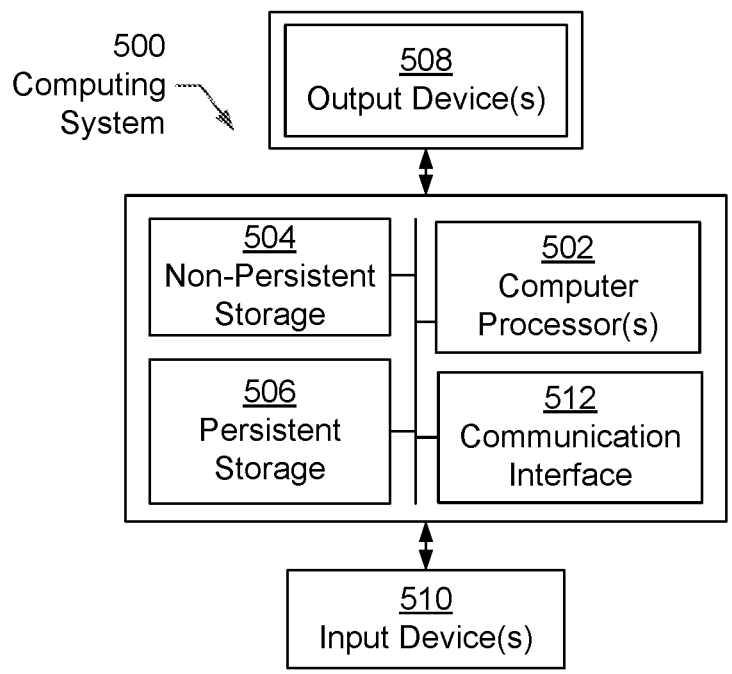
FIG. 5A and FIG. 5B show computing systems in accordance with disclosed embodiments.
Figure 5B:
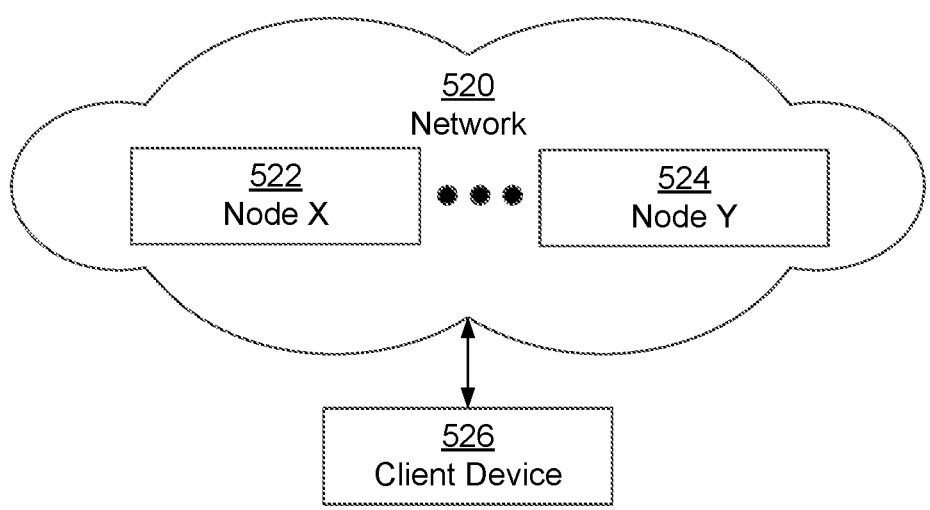

The server computing system (102) is an embodiment of the computing system (500) and the nodes (522) and (524) of FIG. 5A and FIG. 5B. The server computing system (102) includes the server application (104). The server computing system (102) may be operated by web services provider to generate predictions for contact center call volume. A cloud service provider may provide hosting, virtualization, and data storage services, as well as other cloud services, that are used by the web services provider to generate the predictions for contact center call volume.

The server application (104) is a set of programs on the server computing system (102) that generate the predictions for contact center call volume. The server application (104) may interface with the repository (150), the developer computing system (170), and the client computing system (180). The server application (104) may form a Software-as-a-Service (SaaS) platform and utilize container-based deployment, event-driven protocols, non-blocking I/O models, NoSQL data modelling, RESTful API design, etc. The programs that form the server application (104) may be deployed in containers on the server computing system (102).

The repository (150) is a computing system that may include multiple computing devices in accordance with the computing system (500) and the nodes (522) and (524) described below in FIGS. 5A and 5B. The repository (150) may be hosted by the cloud service provider hosting the server computing system (102). The data in the repository (150) may include multiple variables, parameters, historical time series data, and forecasts that are generated and used by the components of the system (100). The data in the repository (150) may be processed by programs executing on the server computing system (102) as described below. The repository (150) may be hosted by the same cloud services provider as the server computing system (102).

The developer computing system (170) is an embodiment of the computing system (500) and the nodes (522) and (524) of FIG. 5A and FIG. 5B. The developer computing system (170) includes the developer application (172) for accessing the server application (104). The developer application (172) may include a graphical user interface for interacting with the server application (104). A user may control the model discovery service (106) by selecting when the model discovery service (106) is executed (e.g., every day at 2:00 AM), selecting the model horizons used by the model discovery service (106), and maintaining the connections between the services of the server application (104) and the databases of the repository (150) that store the data used by the system (100).

The client computing system (180) is an embodiment of the computing system (500) and the nodes (522) and (524) of FIG. 5A and FIG. 5B. The client computing system (180) includes the client application (182) for accessing the server application (104). The client application (182) may include a graphical user interface for interacting with the server application (104). A user may use the client application (182) to consume the data generated by the server application (104). For example, the client application may generate reports and may display reports from the data generated with the server application and stored in the repository (150).

The developer application (172) and the client application (182) may be web browsers that access the server application (104) using web pages hosted by the server computing system (102). Additionally, the developer application (172) and the client application (182) may be web services that communicate with the server application (104) using a representational state transfer application programming interface (RESTful API). Although a client server architecture is shown, one or more parts of the server application (104) may be a local application on the developer computing system (170) and the client computing system (180) without departing from the claimed scope.

Figure 2A:
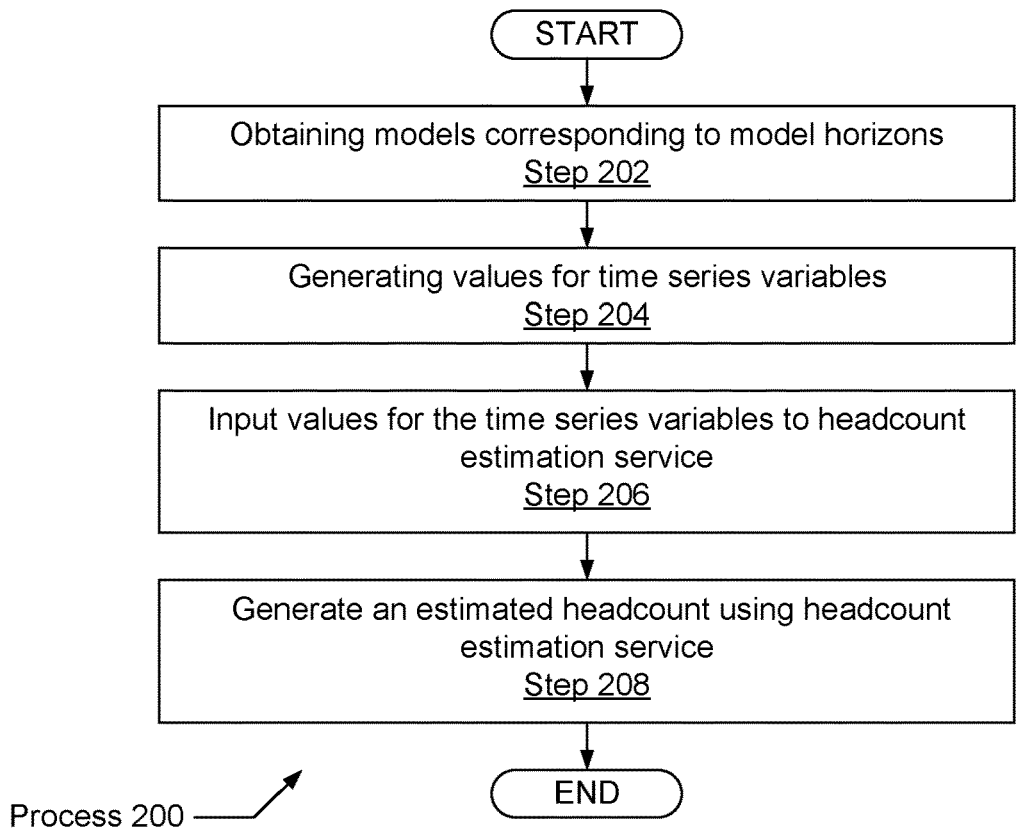
FIG. 2A, FIG. 2B, and FIG. 3 show flowcharts in accordance with disclosed embodiments.
Figure 2B:
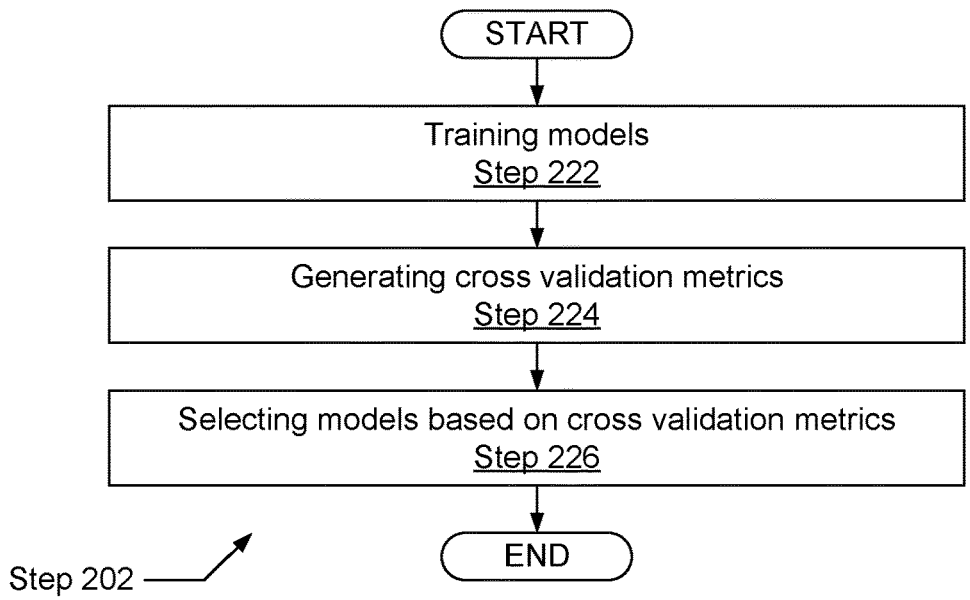
Figure 3:
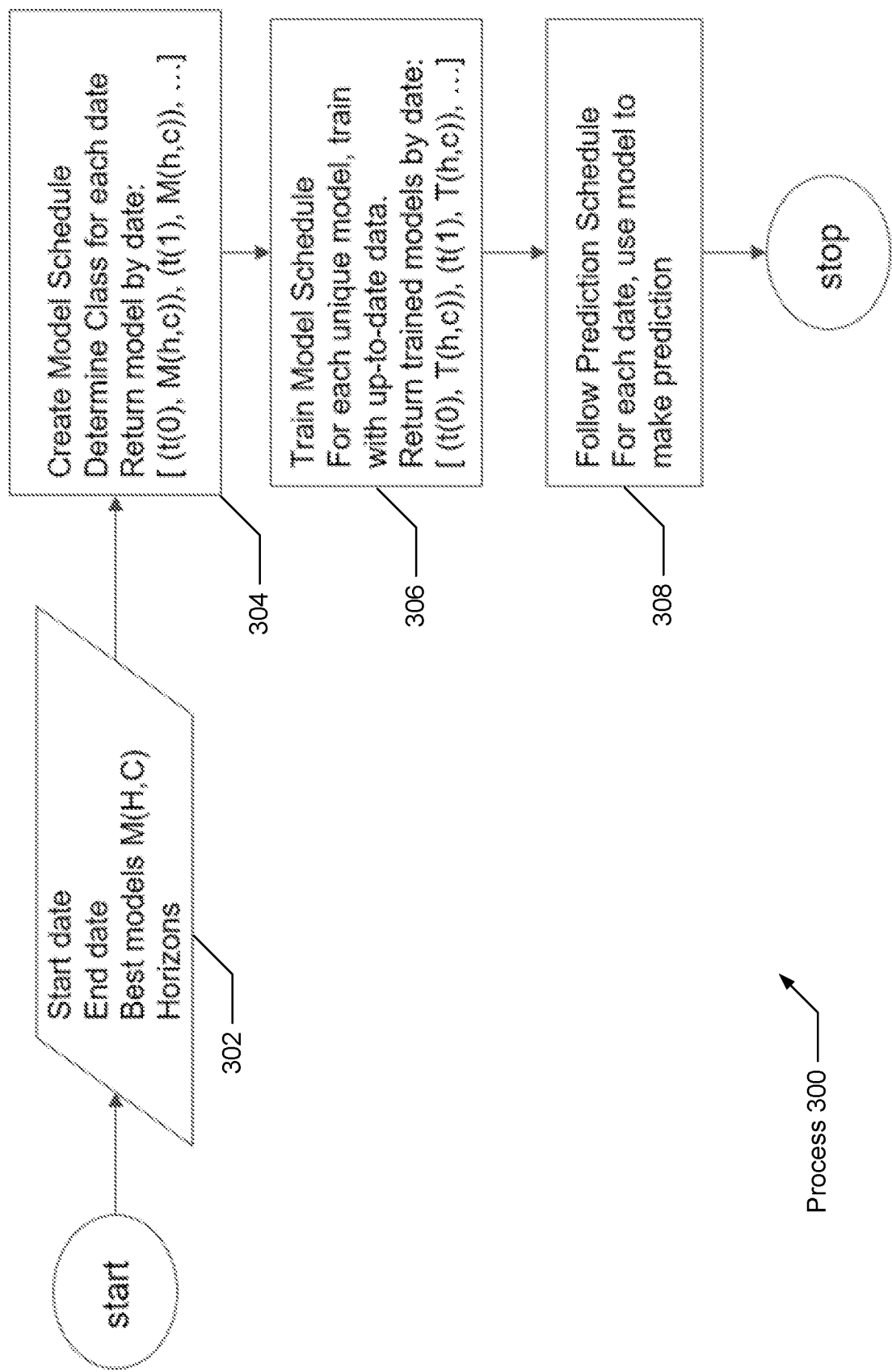

FIG. 2A, FIG. 2B, and FIG. 3 show flowcharts of the process (200) and the process (300) in accordance with the disclosure for training models and predicting call center volume. The embodiments of FIGS. 2A, 2B, and 3 may be combined and may include the features and embodiments described in FIGS. 1, 4, 5A, and 5B. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) generates predictions used to generate estimated headcounts from models with multiple horizons and classes. In Step 202, models are obtained corresponding to model horizons. The models may be autoregressive models, including linear autoregressive models and neural network autoregressive models. The models may include lags from target time series. A target time series is a time series for which a model is used to generate predictions. The lags may include a lag of about one year and may be in the range of 365 plus or minus 3 days. The process of training and selecting models is discussed further below in FIG. 2B.

In Step 204, values are generated for time series variables. The time series variable values are predictions generated with trained models that may have different time horizons and classes. Multiple values for the time series variables may be generated by a demand prediction service. The values may correspond to the days to be predicted. For example, if three days are to be predicted, the three values for each of the time series variables may be correspondingly predicted. The time series variables may include average handle time and call volume.

As a part of generating the values and for each day to be predicted, the model having the model horizon with a lowest value that is greater than or equal to an ordinal value of the day to be predicted may be selected for that day to generate a piecewise forecast for the time series variable being predicted. As an example, models with horizons of 1, 3, and 9 may be trained and available and predictions may be made for nine days. The first day to be predicted would use models with the model horizon of 1. The second and third days to be predicted would use models with the model horizon of 3 because for predicted day 2, which has an ordinal value of 2, the horizon of 3 has the lowest value that is greater than the ordinal value of the day to be predicted. The fourth through ninth days to be predicted would use models with the model horizon of 9. By selecting models based on the model horizon, the model that predicts for day 1 may be stitched together with the model that predicts for days 2 and 3, which is stitched together with the model that predicts for days 4 through 9.

The values for the time series variables form a machine-learning forecast. The machine learning forecast may be combined with an alternative forecast to form a combined forecast. The combined forecast may then be used to generate the estimated headcount. Combining the machine learning forecast with the alternative forecast may be done by taking the weighted average of corresponding values from the machine learning forecast and the alternative forecast.

In Step 206, values for the time series variables are input to a headcount estimation service. The plurality of values for the time series variables may be part of the piecewise forecast generated at Step 204. The values for the time series variables may be stored in a repository from which the values may be pushed into the headcount estimation service by the repository or may be pulled into the headcount estimation service by the headcount estimation service.

In Step 208, an estimated headcount is generated with a headcount estimation service. The estimated headcount may be generated using the Erlang-C traffic modeling formula with the values from the piecewise forecast. The estimated headcount may be presented to and displayed on a client computing device. Additional embodiments may use the piecewise forecast of time series variables for other calculations outside of headcount estimation.

Turning to FIG. 2B, the flow chart of FIG. 2B further describes Step 202 from FIG. 2A. In Step 222, models are trained. Multiple models may be trained having multiple model horizons and classes. As an example, a model discovery service may have a model space of different models that are trained. The model space may include time series models that have different classes, different lags, and be of different types. The different classes of models may include in-season models, out-of-season models, and all-season models. The different lags may include about a one year lag or 365 plus or minus 3 days of lag between the input data for the model and the output prediction of the model. The different types of models may include linear and non-linear (neural network) models, autoregressive or otherwise.

The space of models may be trained for the model horizons. For example, if the model space includes three classes (in-season, out-of-season, and all-season), seven lags (lags of 362 through 368 days), and one type (linear autoregressive), then the model discovery service may train twenty one models for the model horizons. If there are four model horizons (e.g., horizons of 1, 3, 5, and 9 days), then the model discovery service may train 84 models.

The training data used to train the models may include historical time series data for at least two years. Additional data beyond two years may be included and more or less data may be used. The initial training of the models may use a subset of data (e.g., the trailing two years of data). Then after the models are selected, the selected models may be trained with the additional training data that was not used prior to model selection. This reduces the time needed to select the models and improves the accuracy of the models.

In Step 224, cross validation metrics are generated. The cross validation metrics may be generated by the model discovery service for the space of models that were trained. For example, when the model space includes 84 models, cross validation metrics are generated for each of the 84 models. Different classes of models may use different data for testing and generating cross validation metrics. For example, in-season models may be tested against in-season data, out-of-season model may be tested against out-of-season data, and all-season models may be tested against all-season data (e.g., the superset of in-season data and out-of-season data). The cross validation metrics may include a mean absolute scaled error (MASE) and a weighted mean absolute percentage error (wMAPE) for the models. Other metrics that may be used include mean absolute percentage error (MAPE), root mean square error (RMSE), explained variance (R2), and mean absolute error (MAE).

In Step 226, models are selected based on cross validation metrics. The model discovery service may select a model for a class and a horizon that includes the optimal cross validation metric of the models for the class and horizon. As an example, the model discovery service may select the model with the lowest mean absolute scaled error or the lowest weighted mean absolute percentage error. Additionally, multiple cross validation metrics may be weighted and combined into a single cross validation measure for corresponding models. The model with the optimal (highest or lowest depending on which metrics are used and how the metrics are combined) cross validation measure is then selected. The model may also be selected by taking into account the selection of other models used for predicting other parts of the forecast time horizon, in this way jointly optimizing a shared objective function, such as maintaining smoothness between pieces of the prediction. The model selection process may try multiple different models and each one may be distinguished by having a different set of lags and features.

Turning to FIG. 3, the flow chart of FIG. 3 describes the process (300) that trains and uses models to predict time series data by a model discovery service. In Step 302, constraints are identified for the system. The constraints may include a start date, an end date, a list of the best models for each horizon and class, and a list of horizons for which the models will be trained.

The start date may be the date for the first prediction to be generated. The end date may be the date of the last prediction to be generated. Prior to training, the list of best models may be empty and after training the list may include the best models selected based on the cross validation metrics of the trained models from the model space. The list of best models may reference the models by the horizon and class of the model so that "M(H,C)" identifies model "M" for the horizon "H" and the class "C".

In Step 304, a model schedule is created, classes are determined for each date, and models are returned by date.

The model schedule includes each day between and including the start date and end date that were previously identified.

For each of the identified dates, the class that applies to that date is identified. For example, the classes may include in-season, out-of-season, and all-season classes, and one of the classes may be assigned to each date for which a prediction will be generated. This may reduce the amount of time and processing power needed to train the models when some of the classes are not used.

The models may be returned by date in the form of a list of tuples (e.g., "[(t(0), M(h,c))), (t(1), M(h,c))), . . . ]". A first element of the tuple may identify the date to be predicted (e.g., "t(0)" and "t(1)"). The second element of the tuple may identify a model (e.g., "M(h,c)"). The model "M(h,c)" is the best model from the model space for the horizon "h" and the class "c" selected by the model discovery service based on cross validation metrics for the models from the model space.

In Step 306, the model schedule is trained with up-to-date data and returned. The model schedule may be trained by identifying the unique models from the schedule and training those models. As an example, the model schedule (which is a list of (date, model) tuples) may include 100 dates and 8 unique models.

Each of the unique models is trained with up-to-date data that may not have been used when selecting the model from the model space. For example, when selecting the models from the model space, the training data for model selection may include historical data but may not include the most recent data. After selection, the model may be retrained with the most recent data or a combination of the most recent data and historical data.

The trained models may be returned in the form of a list of tuples (e.g., "[(t(0), T(h,c))), (t(1), T(h,c))), . . . ]". The identifier "T(h,c)" identifies trained model T for horizon "h" and class "c" was selected and has been trained with up-to-date data.

In Step 308, a prediction schedule is followed to make predictions with the models trained under the model schedule. The prediction schedule includes each day between and including the start date and end date that were previously identified at Step 302. Predictions are made for each date of the prediction schedule using the trained models identified in Step 306 from the model schedule.

Figure 4:
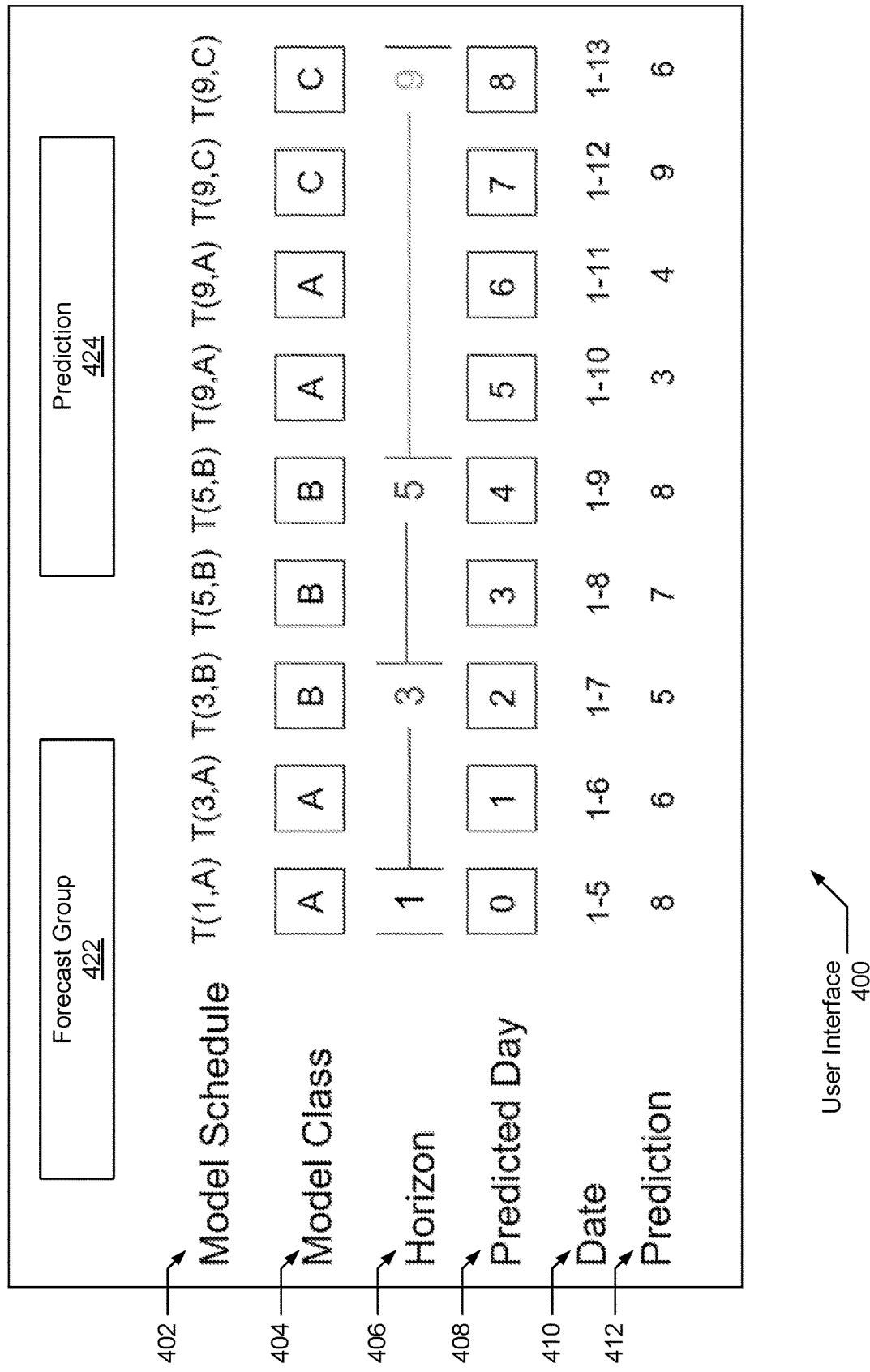
FIG. 4 shows an example in accordance with disclosed embodiments.

FIG. 4 shows an example that may be combined and may be part of the embodiments shown in the other figures, including the systems of FIG. 1, FIG. 7A, and FIG. 7B. The various elements, widgets, components, and interfaces shown in FIG. 4 may be omitted, repeated, combined, and/or altered as shown. Accordingly, the scope of the present disclosure should not be considered limited to the specific arrangements shown in FIG. 4.

The diagram of FIG. 4 illustrates how the piecewise model selection and stitching work and may be displayed on the graphical user interface (400). The diagram in the graphical user interface (400) displays several rows (402) through (412) of data. The columns of data displayed in the diagram in the graphical user interface (400) correspond to the dates being predicted, which are identified in the row (410) as being from January 5 through January 13. The diagram in the graphical user interface (400) may be scrolled left and right to view additional days, predictions, and information.

The row (402) displays the model schedule. The model schedule includes multiple trained models for multiple horizons and multiple classes. The model schedule identifies the model used for each day to be predicted. The graphical user interface (400) shows nine days of predictions (predicted days 0 through 8) using six different models: T(1,A), T(3,A), T(3,B), T(5,B), T(9,A), and T(9,C). The "T" indicates that the model has been trained, the number (1, 3, 5, or 9) indicates the horizon of the trained model, and the letter (A, B, or C) indicates the class of the model. Different horizons and classes may be used. The models may be linear autoregressive models.

The row (404) displays the classes of the models used to generate the predictions of the row (412). Three different classes are used: A, B, and C. Class A may be an in-season class, class B may be an out-of-season class, and class C may be an all-season class.

The row (406) displays the horizons of the models used to generate the predictions of the row (412). Four different horizons (1, 3, 5, and 9) are displayed.

The row (408) displays identifiers for the predicted day. The predicted days are zero based. Nine predicted days are displayed from zero through eight. Additional days may be included.

The row (410) displays the date for the predicted days. The dates range from January 5 to January 13.

The row (412) displays a piecewise prediction forecast generated based on multiple models. For example, the model "T(1,A)" is used to generate the predicted value of "8" for the predicted day "0" that corresponds to the date of January 5 using a horizon of 1 and a class of A. The class A may identify the model as an in-season model and the predicted value may be the number of contacts received for a forecast group (e.g., it may be predicted that the forecast group will receive eight calls on January 5, which is predicted day 0). Different models are used to predict other values to form the piecewise prediction forecast. Different variables and different forecast groups may be selected and shown with the user interface elements (422) and (424).

The user interface element (422) is a button. Selection of the button (422) may display a menu for selecting a forecast group for which to display predictions.

The user interface element (424) is a button. Selection of the button (424) may display a menu for selecting which type of predictions to display.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) may also be a virtual machine. The virtual machine may be hosted on a physical computer system by a cloud services provider.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention.

The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token ""type"").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5A, while performing one or more embodiments of the invention, may perform data comparison. Data comparison may be used to compare two or more data values (e.g., A, B). For example, one or more embodiments may determine whether $A>B$, $A=B$, $A!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., A−B), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
obtaining, by a model discovery service, a plurality of models comprising:
for each model horizon of a plurality of model horizons,
training a plurality of training models having the model horizon;
generating a plurality of cross validation metrics from the plurality of training models;
selecting a training model of the plurality of training models as a selected model for the model horizon using the plurality of cross validation metrics;
generating, by a demand prediction service, a plurality of values for a time series variable, the plurality of values corresponding to a plurality of days to be predicted, wherein generating the plurality of values comprises:
selecting, for a day of the plurality of days, the selected model, from the plurality of models, having the model horizon with a lowest value that is greater than or equal to an ordinal value of the day,
selecting, for another day of the plurality of days, a second model from the plurality of models, and
stitching output from the selected model together with output from the second model to form the plurality of values;
inputting the plurality of values for the time series variable as part of a piecewise forecast to a headcount estimation service; and
generating, by the headcount estimation service with the piecewise forecast, an estimated headcount from the time series variable.

2. The method of claim 1, wherein selecting the training model further comprises:
testing the selected model against one of in-season training data and out-of-season training data.

3. The method of claim 1, wherein generating the plurality of cross validation metrics further comprises:
generating a cross validation metric of the plurality of cross validation metrics as one of a group comprising a mean absolute scaled error (MASE) and a weighted mean absolute percentage error (wMAPE).

4. The method of claim 1, wherein selecting the plurality of models further comprises:
training a plurality of training models with training data that includes historical time series data for at least two years.

5. The method of claim 1, further comprising:
combining a machine learning forecast, generated from the plurality of values, with an alternative forecast to form the piecewise forecast as a combined forecast.

6. The method of claim 1, wherein the selected model is an autoregressive model.

7. The method of claim 1, wherein the selected model includes one or more lags from a target time series.

8. A system comprising:
a processor;
a memory coupled to the processor;
the memory comprising an application, wherein the application executes on the processor, uses the memory, and is configured for:
obtaining, by a model discovery service, a plurality of models comprising:
for each model horizon of a plurality of model horizons,
training a plurality of training models having the model horizon;
generating a plurality of cross validation metrics from the plurality of training models;
selecting a training model of the plurality of training models as a selected model for the model horizon using the plurality of cross validation metrics;
generating, by a demand prediction service, a plurality of values for a time series variable, the plurality of values corresponding to a plurality of days to be predicted, wherein generating the plurality of values comprises:
selecting, for a day of the plurality of days, the selected model, from the plurality of models, having the model horizon with a lowest value that is greater than or equal to an ordinal value of the day,
selecting, for another day of the plurality of days, a second model from the plurality of models, and
stitching output from the selected model together with output from the second model to form the plurality of values;
inputting the plurality of values for the time series variable as part of a piecewise forecast to a headcount estimation service; and
generating, by the headcount estimation service with the piecewise forecast, an estimated headcount from the time series variable.

9. The system of claim 8, wherein selecting the training model further comprises:
  testing the selected model against one of in-season training data and out-of-season training data.

10. The system of claim 8, wherein generating the plurality of cross validation metrics further comprises:
  generating a cross validation metric of the plurality of cross validation metrics as one selected from a group consisting of a mean absolute scaled error (MASE) and a weighted mean absolute percentage error (wMAPE).

11. The system of claim 8, wherein selecting the plurality of models further comprises:
  training a plurality of training models with training data that includes historical time series data for at least two years.

12. The system of claim 8, wherein the application is further configured for:
  combining a machine learning forecast, generated from the plurality of values, with an alternative forecast to form the piecewise forecast as a combined forecast.

13. The system of claim 8, wherein the selected model is an autoregressive model.

14. The system of claim 8, wherein the selected model includes one or more lags from a target time series.

15. A non-transitory computer readable medium comprising computer readable program code for:
  obtaining, by a model discovery service, a plurality of models comprising:
    for each model horizon of a plurality of model horizons,
      training a plurality of training models having the model horizon;
      generating a plurality of cross validation metrics from the plurality of training models;
      selecting a training model of the plurality of training models as a selected model for the model horizon using the plurality of cross validation metrics;
  generating, by a demand prediction service, a plurality of values for a time series variable, the plurality of values corresponding to a plurality of days to be predicted, wherein generating the plurality of values comprises:
    selecting, for a day of the plurality of days, the selected model, from the plurality of models, having the model horizon with a lowest value that is greater than or equal to an ordinal value of the day,
    selecting, for another day of the plurality of days, a second model from the plurality of models, and
    stitching output from the selected model together with output from the second model to form the plurality of values;
  inputting the plurality of values for the time series variable as part of a piecewise forecast to a headcount estimation service; and
  generating, by the headcount estimation service with the piecewise forecast, an estimated headcount from the time series variable.

16. The non-transitory computer readable medium of claim 15, wherein selecting the training model further comprises:
  testing the selected model against one of in-season training data and out-of-season training data.

17. The non-transitory computer readable medium of claim 15, wherein generating the plurality of cross validation metrics further comprises:
  generating a cross validation metric of the plurality of cross validation metrics as one of a group comprising a mean absolute scaled error (MASE) and a weighted mean absolute percentage error (wMAPE).

18. The non-transitory computer readable medium of claim 15, wherein selecting the plurality of models further comprises:
  training a plurality of training models with training data that includes historical time series data for at least two years.

19. The non-transitory computer readable medium of claim 15, further comprising computer readable program code for:
  combining a machine learning forecast, generated from the plurality of values, with an alternative forecast to form the piecewise forecast as a combined forecast.

20. The non-transitory computer readable medium of claim 15, wherein the selected model is an autoregressive model.

* * * * *